US008995770B2

(12) United States Patent
Kennard et al.

(10) Patent No.: US 8,995,770 B2
(45) Date of Patent: Mar. 31, 2015

(54) WORD WARPING FOR OFFLINE HANDWRITING RECOGNITION

(75) Inventors: Douglas J. Kennard, Provo, UT (US); William Arthur Barrett, Provo, UT (US); Thomas Warren Sederberg, Orem, UT (US)

(73) Assignee: Brigham Young University, Provo, UT (US)

(*) Notice: Subject to any disclaimer, the term of this patent is extended or adjusted under 35 U.S.C. 154(b) by 118 days.

(21) Appl. No.: 13/545,787

(22) Filed: Jul. 10, 2012

(65) Prior Publication Data

US 2013/0016914 A1 Jan. 17, 2013

Related U.S. Application Data

(60) Provisional application No. 61/572,092, filed on Jul. 11, 2011.

(51) Int. Cl.
*G06K 9/00* (2006.01)
*G06K 9/62* (2006.01)
*G06K 9/36* (2006.01)
*G06K 9/32* (2006.01)

(52) U.S. Cl.
CPC ........ *G06K 9/00852* (2013.01); *G06K 9/00161* (2013.01)
USPC ............ 382/187; 382/209; 382/277; 382/294

(58) Field of Classification Search
None
See application file for complete search history.

(56) References Cited

U.S. PATENT DOCUMENTS 8,194,936 B2*  6/2012  Abramoff et al. ............. 382/117
2012/0134590 A1*  5/2012  Petrou et al. .................. 382/182

OTHER PUBLICATIONS

Wakahara et al, "Adaptive Normalization of Handwritten Characters Using Global/Local Affine Transformation," 1998, IEEE Transactions on Pattern Analysis and Machine Intelligence, vol. 20, No. 12, pp. 1332-1341.*
You et al, "Similarity Measurement for Off-Line Signature Verification," ICIC 2005, Part I, LNCS 3644, pp. 272-281.*
Song et al, "Evaluating Image Registration Using NIREP," WBIR 2010, LNCS 6204, pp. 140-150.*
Gao, Peisheng, and Sederberg, Thomas W., "A Work Minimization Approach to Image Morphing." The Visual Computer, vol. 14, pp. 390-400, 1998.
Hutchinson, Luke A. D. and Barrett, William A., Fourier-Mellin Registration of Line-Delineated Tabular Document Images, International Journal on Document Analysis and Recognition (IJDAR), vol. 8, pp. 87-110, Jun. 2006.
Kennard, Douglas J. and Barrett, William A., "Separating Lines of Text in Free-Form Handwritten Historical Documents," In International Workshop on Document Image Analysis for Libraries (DIAL), pp. 12-23, Lyon, France, Apr. 2006.

(Continued)

*Primary Examiner* — Bhavesh Mehta
*Assistant Examiner* — David F Dunphy
(74) *Attorney, Agent, or Firm* — Workman Nydegger (57) ABSTRACT

Performing word recognition operations to determine what an image of a word represents. The method includes accessing a first image. The first image represents an image version of a word. The method further includes accessing a second image. The second image also represents an image version of a word. Using a warp mesh, the method includes warping the second image to cause the second image to approximately match the first image by applying a mesh to the second image and moving vertices of the mesh to warp the second image. The difference between the warped second image and the unwarped first image are determined.

21 Claims, 9 Drawing Sheets

(56) References Cited

OTHER PUBLICATIONS

Koerich, Alessandro, L. Sabourin, Robert, and Suen, Ching Y., "Large Vocabulary Off-line Handwriting Recognition: A Survey," Pattern Analysis and Applications, vol. 6 pp. 97-121, 2003.

Lavrenko, Victor, Rath, Toni M. and Manmatha, R. Manmatha, "Holistic Word Recognition for Handwritten Historical Documents," In Proc. of the Int'l Workshop on Document Image Analysis for Libraries (DIAL), pp. 278-287, Palo Alto, CA, Jan. 2004.

Madhvanath, Sriganesh and Govidaraju, Venu, "The Role of Holistic Paradigms in Handwritten Word Recognition," IEEE Transactions on Pattern Analysis and Machine Intelligence (PAMI), vol. 23, Issue 2, pp. 149-164, Feb. 2001.

Pavlidis, Ioannis, Singh, Rahul, and Papanikolopoulos, Nikolaos P., "On-line Handwriting Recognition Using Physics-Based Shape Metamorphosis," Pattern Recognition, vol. 31, Issue 11, pp. 589-1600, 1998.

Plamondon, Rejean and Srihari, Sargur N., "On-line and Offline Handwriting Recognition: A Comprehensive Survey," IEEE Transactions on Pattern Analysis and Machine Intelligence (PAMI), vol. 22 Issue 1, pp. 63-84, Jan. 2000.

Rath, Toni M. and Manmatha, R., "Features for Word Spotting in Historical Manuscripts," In 7th International Conference on Document Analysis and Recognition (ICDAR). Volume I, pp. 218-222, Edinburgh, Scotland, Aug. 2003.

Rath, Toni M. and Manmatha, R., "Word Image Matching Using Dynamic Time Warping," In Proc. of the Conference on Computer Vision and Pattern Recognition (CVPR), vol. 2, pp. 521-527, Madison. Wisconsin. Jun. 2003.

Sederberg, Thomas W. and Greenwod, Eugene, "A Physically Based Approach to 2-D Shape Blending," Computer Graphics, vol. 26, Issue 2, pp. 25-34, Jul. 1992.

Singh, Rahul and Papanikolopoulos, Nikolaos P., "Planar Shape Recognition by Shape Morphing" Pattern Recognition, vol. 33 pp. 1683-1699, 2000.

Steinherz, Tal, Rivlin, Ehud, and Intrator, Nathan, "Offline Cursive Script Word Recognition—A Survey" International Journal on Document Analysis and Recognition (IJDAR), vol. 2 pp. 90-110, 1999.

\* cited by examiner

WORD WARPING FOR OFFLINE HANDWRITING RECOGNITION

CROSS-REFERENCE TO RELATED APPLICATIONS

This application claims the benefit of U.S. Provisional application 61/572,092 filed Jul. 11, 2011, titled "Word Warping for Offline Handwriting Recognition", which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Computers have been used in recent times to import non-digital data into computer system to digitize the data and make the data available for computer processing. For example, optical character recognition (OCR) systems are able to scan in typewritten or handwritten text and to convert the scanned text into a digital representations (such as for example, ascii representations) of characters, words or images. However, these systems often suffer from at least some degree of inaccuracy. In particular, OCR systems can mistake one character for another which results in the output of the OCR systems being inaccurate and introducing errors into the results of the OCR operations. This can be particularly true when OCR systems are attempting to recognize handwritten text or heavily stylized printed text.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for performing word recognition operations to determine what an image of a word represents. The method includes accessing a first image. The first image represents an image version of a word. The method further includes accessing a second image. The second image also represents an image version of a word. Using a warp mesh, the method includes warping the second image to cause the second image to approximately match the first image by applying a mesh to the second image and moving vertices of the mesh to warp the second image. The difference between the warped second image and the unwarped first image are determined.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein are directed to recognizing whole words by using two-dimensional (2-D) warping of words and creation of distance maps to compare warped words to unwarped words for word recognition purposes. In particular, during a training phase, words in the form of images for certain handwritten versions of the words can be identified definitively either manually or automatically with manual assistance. An image of word to be deciphered can be scanned into the system. The image of the word to be deciphered can be compared to the images of the definitively defined handwritten versions of words to determine what the image of the word to be deciphered represents. However, rather than simply comparing a first image representing a word to be deciphered to a second image of a definitively defined handwritten version of a word, warping operations are performed on either or both of the first and second images to try to cause the images to match each other. After the warping operations are performed, a distance map may be used to determine if the first and second images likely represent the same word.

Embodiments implement a novel method of offline whole word handwriting recognition. Embodiments may additionally use automatic image morphing to compute 2-D geometric warps that align the strokes of each word image with the strokes of word images of training examples. Once the strokes of a given word are aligned to a training example, embodiments use distance maps to compare how similar the two words are. Like 1-D Dynamic Programming (DP) methods, the illustrated warp-based method may be implemented to be robust to limited variation in word length and letter spacing. However, due to its 2-D nature, the illustrated method may be more robust than 1-D DP methods in handling variations caused by additional inconsistencies in character shape and stroke placement. In particular, embodiments handle some of the local variation inherent in handwriting such as inconsistent ink thickness and letters that are unevenly spaced, stretched, compressed, or similarly distorted.

Figure 1:
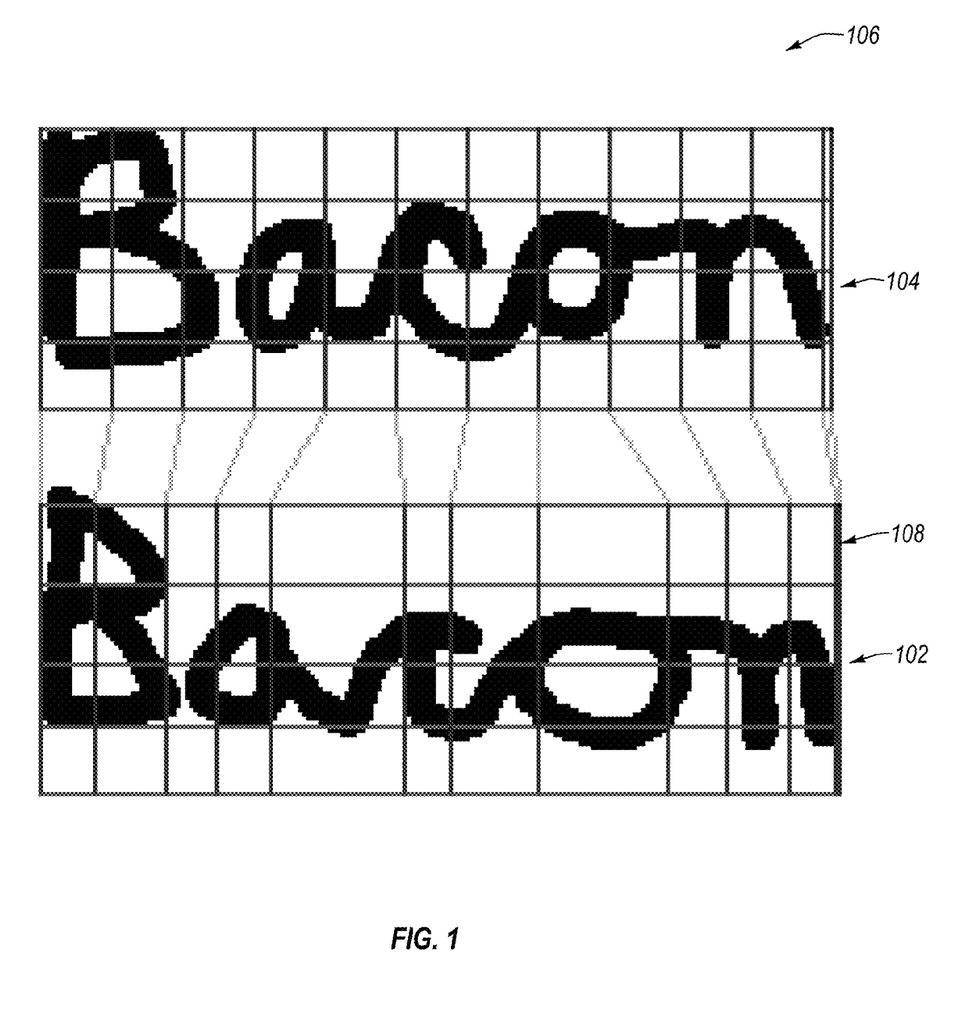
FIG. 1 illustrates first and second images representing handwritten text and a rectangular mesh applied to the second image and how a corresponding mesh aligns to the first image after using 1-D Dynamic Programming independently in the horizontal and vertical directions.
Figure 2:
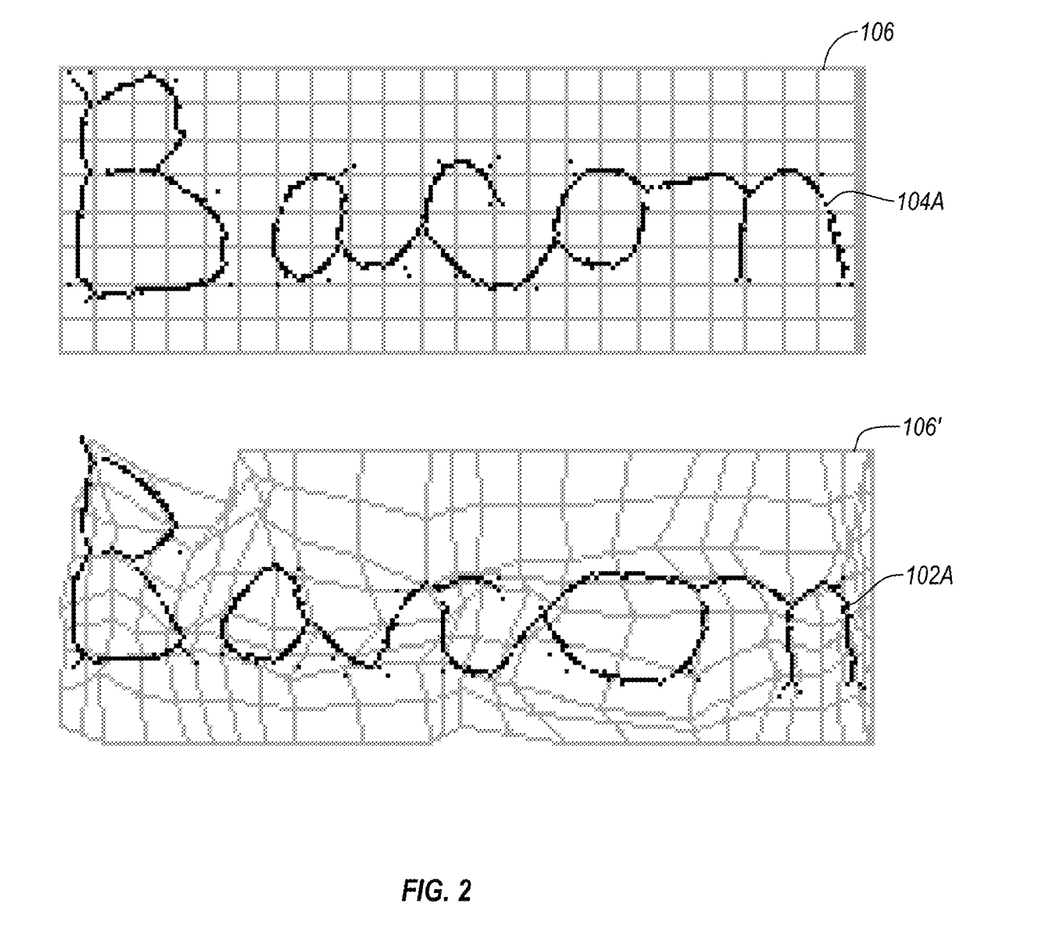
FIG. 2 illustrates the warp grid used to warp the medial axis of the second image.

Referring now to FIG. 1, a first image 102 representing a word and a second image 104 representing a word are shown. Embodiments perform operations to warp the second image 104 to attempt to match the first image 102. FIG. 1 shows a rectangular mesh 106 applied to the second image 104 and then on the bottom it shows how the corresponding mesh 108 aligns to the first image 102 after using 1-D Dynamic Programming independently in the horizontal and vertical directions. Referring now to FIG. 2, for the given pair of images, embodiments create a regularly-spaced rectangular mesh 106 on the medial axis 104A of the second image 104 and a corresponding warp mesh 106' that defines how to push, pull, bend, and stretch the ink of the medial axis 104A of the second image 104 to align the medial axis 104A of the second image 104 with the ink in the medial axis 102A of the first image 102. Aligning the ink allows embodiments to ignore many of the local differences and variations inherent in handwriting and instead compare words at a more structural level. Once the ink is aligned by warping, embodiments use distance maps to quantify the differences between the warped version of medial axis 104A and medial axis 102A.

To define the warp mesh used in alignment, embodiments first coarsely align the rectangular meshes 106 and 108 of the first and second images 102 and 104 respectively as illustrated in FIG. 1 by using 1-D Dynamic Programming (DP) in both the horizontal and vertical directions. After coarse alignment, embodiments perform a more detailed alignment by using an image morphing algorithm, such as the one described below, to increase the mesh resolution and iteratively adjust the control points (vertices) of the warp mesh 106' as illustrated in FIG. 2. However, in some embodiments, the mesh resolution is not increased. It may, in some cases, be better not to increase the resolution. Thus, the increase in resolution may be optional. Some embodiments only use full-thickness word images for the coarse alignment. These embodiments use medial axis pixels of the words throughout the rest of the process to simplify the illustrated morphing algorithm and the distance metric embodiments used to compare words.

While the example above is illustrated using a rectangular warp mesh, other embodiments of performing image morphing that do not require the use of a rectangular warp mesh. For example, some embodiments may use irregular triangular meshes.

Figure 3:
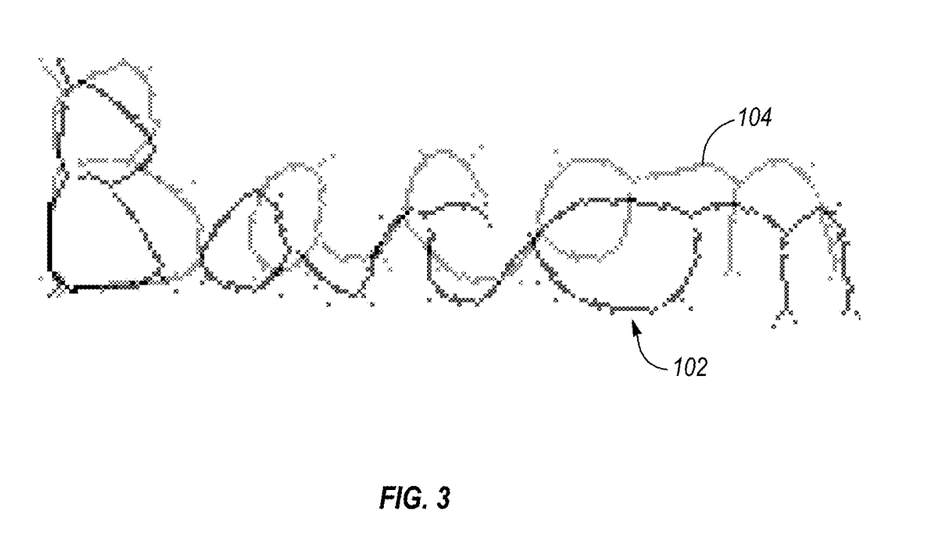
FIG. 3 illustrates medial axes of the first and second images superimposed on each other.
Figure 4:
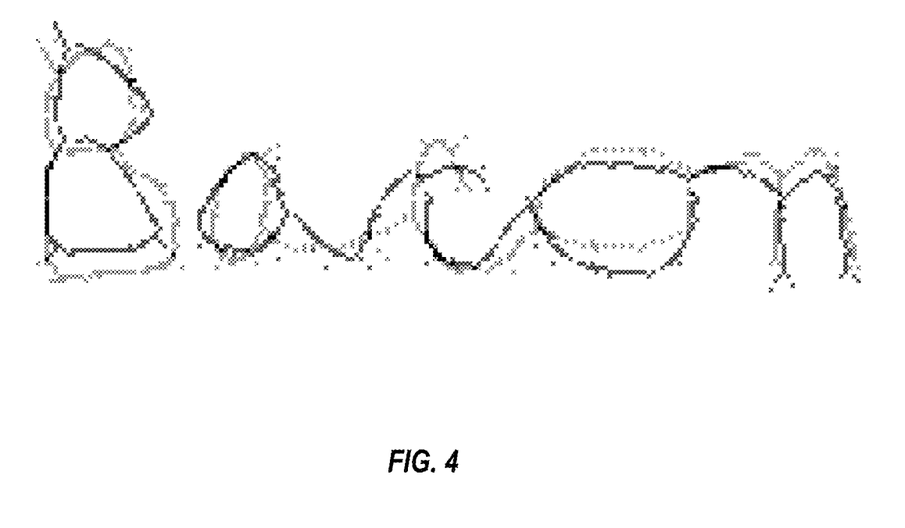
FIG. 4 illustrates a warped version of the medial axis of the second image superimposed on the medial axis of the first image with the mesh only coarsely aligned using 1-D dynamic programming.
Figure 5:
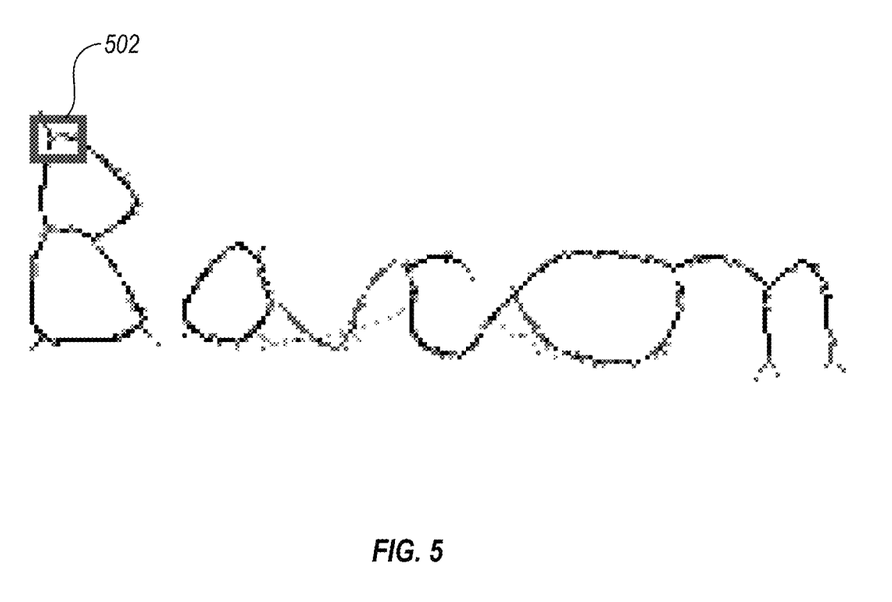
FIG. 5 illustrates a warped version of the medial axis of the second image superimposed on the medial axis of the first image using a morphing alignment algorithm.
Figure 6:
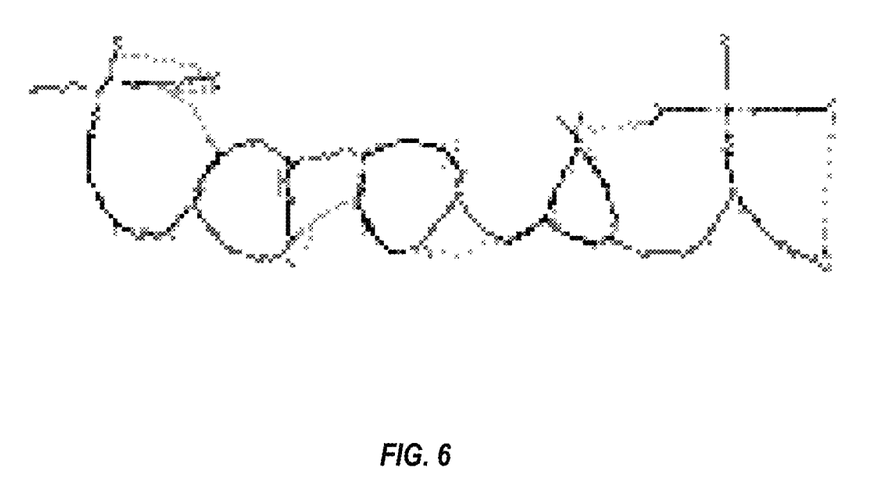
FIG. 6 illustrates a warped version of the medial axis of the word "toast" superimposed on the medial axis of the word "Bacon"

FIG. 3 illustrates the first image 102 superimposed on the second image 104 by their medial axis. FIG. 4 illustrates pixels of each medial axis of each image using only coarse alignment to warp the second image 104 to the first image 102. FIG. 5 illustrates warping of the second image 104 to the first image 102 with the mesh improved by "morphing" as described below. FIG. 6 illustrates warping an image for the word "Bacon" to the wrong word "toast". As illustrated, this does not align well.

Figure 7:
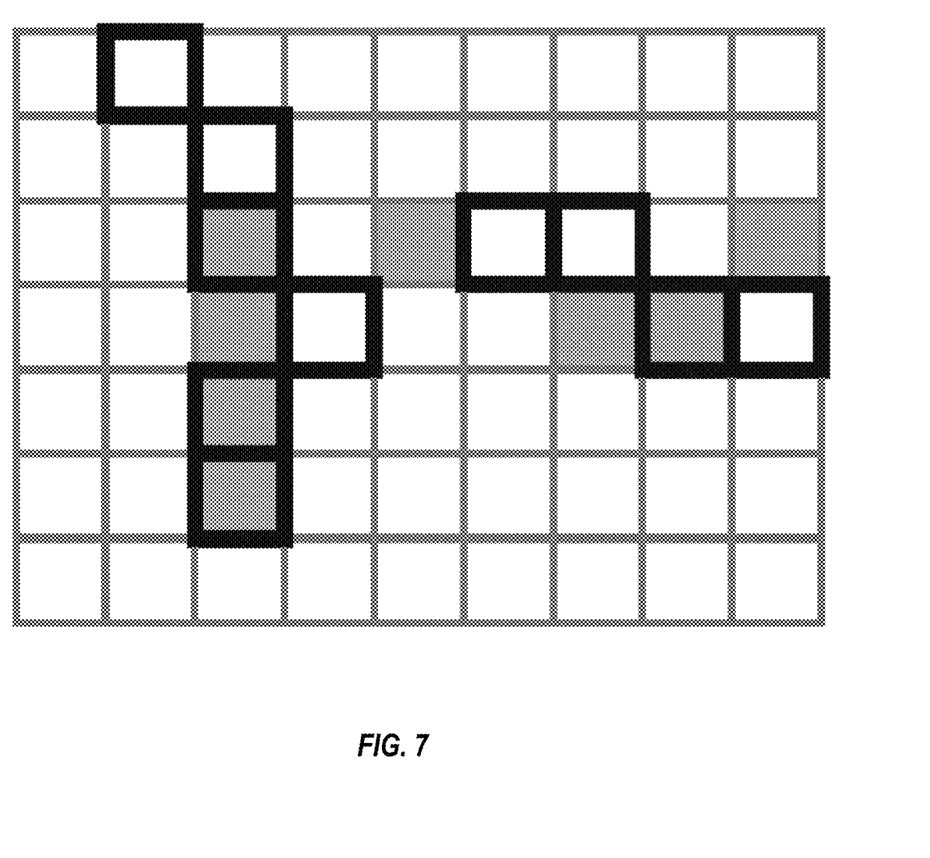
FIG. 7 illustrates an overlay of medial axes.
Figure 8:
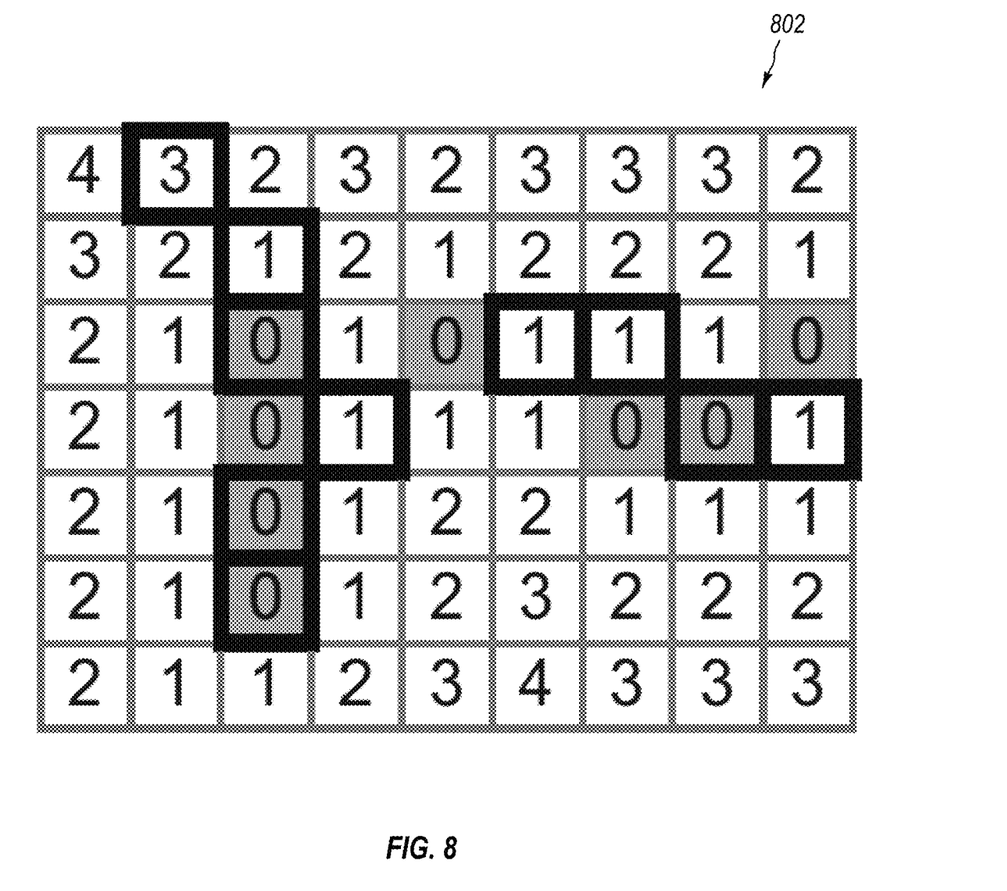
FIG. 8 illustrates a distance map with respect to the warped medial axis of the second image, and the medial axis of the first word superimposed on the distance map.

FIG. 7 illustrates an overlay of medial axes from a rectangular region 502 illustrated in FIG. 5. FIG. 8 illustrates the results of computing a distance map after obtaining the results of the warping operation illustrated in FIG. 5. The distance map 802 includes a pixel map showing for each pixel a distance in pixels from the warped medial axis pixels, wherein the warped medial axis is shown by the shaded pixels. Any pixel with a distance map value of 0 lies on the medial axis. The number in a box representing a pixel is the distance in pixels with respect to a pixel of the shaded medial axis. A word matching cost can be computed by computing a normalized sum of the distance values of pixels for the second image as illustrated by the heavy border outlined squares. This is the "distance" from shaded medial axis. A few distances that seem smaller than expected in FIG. 8 are due to pixels that exist in the image but that are not visible in this rectangular region. For example, for the "2" and "1" in the first two columns of the last row, there is a shaded pixel just below the 1 in the second column that is not seen in FIG. 8.

When deciding how similar two medial axes are after warping one to the other, it may be advantageous to compute both an average distance of the unwarped first image from the warped second image and an average distance of the warped second image to the unwarped first image and add those two together (instead of just normalizing the distance of the unwarped first image from the warped second image).

In the examples that follow, the following table is useful:

TABLE 1

$I_0, I_1$: The two images being compared
$w_0, w_0, h_0, w_1, h_1$ Width, height of $I_0$ and $I_1$
$M_0, M_1$: Meshes defining the 2-D warp from $I_0$ to $I_1$
$P_{c,r}^0$: Control point (vertex) in $M_0$ at col c, row $r$
$P_{c,r}^1$: Control point (vertex) in $M_1$ at col c, row $r$
$A_0, A_1$: Medial Axis pixels of $I_0$ and $I_1$
$A_0'$: Pixels of $A_0$ after being warped (using $M_0$ to $M_1$)
$D_0'$: Distance map created from $A_0'$
$D_1$: Distance map created from $A_1$
$F_0, F_1$: Feature vectors for DP alignment
$C_{0 \to 1}$: Cost of matching $I_0$ to $I_1$
$C_{1 \to 0}$: Cost of matching $I_1$ to $I_0$
$C(I_0, I_1)$: Total word matching cost between $I_0$ and $I_1$ For a given pair of word images, $I_0$ and $I_1$, with width/height $w_0/h_0$ and $w_1/h_1$, embodiments create corresponding rectangular meshes, $M_0$ and $M_1$. Initial control point spacing for $M_0$ is max($h_0$, 4) except for the last row and column of control points, which are placed at $y=h_0-1$ and $x=w_0-1$. The control points of $M_1$ (the warp mesh) are not spaced evenly, but instead are coarsely aligned by 1-D DP. Morphing may then be used to adjust them so that the warped medial axis pixels, $A_0'$, align more closely to the medial axis pixels ($A_1$) of $I_1$. Embodiments then use $D_0'$, the distance map from $A_0'$, to compute $C_{0 \to 1}$. Some embodiments may also use $D_1$ to compute $C_{0 \to 1}$. $C_{0 \to 1}$ is the cost to match $I_0$ to $I_1$.

As the cost to match $I_0$ to $I_1$ is not necessarily the same as the cost to match $I_1$ to $I_0$, some embodiments may repeat the steps with $I_0$ and $I_1$ swapped to compute $C_{1 \to 0}$. In these embodiments, the total word matching cost, $C(I_0, I_1)$, is the sum:

$$C(I_0, I_1) = C_{0 \to 1} + C_{1 \to 0}$$

Adding the two costs ensures that $C(I_0, I_1)$ is symmetric for a given pair of images regardless of order. $C(I_0, I_1)$ is the distance metric that embodiments use for word comparison. Reference herein is made to "cost" to avoid confusion with distances in distance maps.

Recognition of a word is performed by computing the word matching cost between it and each training example and using the label from the training example resulting in the minimum word matching cost. Some embodiments may use simple threshold word matching costs such that if a computed cost is below a certain threshold, the comparison is considered a match.

Embodiments may preprocess manually-segmented word images by performing background removal, slant correction, crop/pad, and binarization. Background estimation for background removal may be computed with a large median kernel. Examples of such estimation are illustrated in work by Luke A. D. Hutchison and William A. Barrett titled "Fourier-Mellin registration of line-delineated tabular document images" described in *International Journal on Document Analysis and Recognition* (IJDAR), 8:87-110, June 2006, which is incorporated herein by reference in its entirety. After background removal, a global threshold value for each page is determined for later binarization. In some embodiments, this may be performed using the method described in work by Douglas J. Kennard and William A Barrett titled "Separating lines of text in free-form handwritten historical documents" which is described in *International Workshop on Document Image Analysis for Libraries* (DIAL), pages 12-23, Lyon, France, April 2006, which is incorporated herein by reference in its entirety. Slant correction includes horizontal image shear after estimating the slant angle over the central region of each page image. The angle estimation uses ink runlengths accumulated into a histogram based on angle bins. Baseline estimation is used to determine whether to pad the top or bottom of the image, and the image is cropped to the left-most/right-most ink pixel after the slant removal. After all other preprocessing, the word image is binarized using the previously selected threshold. Some embodiments additionally pad the left and right side of the preprocessed images with a single column of background. This may improve accuracy in at least some cases.

Embodiments may compute distance maps, such as the distance map illustrated in FIG. 8 for bitonal images using a forward-backward algorithm. Each pixel in the resulting distance map contains the Manhattan distance (in number of pixels) to the nearest edge of an ink component. The greater the distance from ink, the higher the value of the pixel in the distance map. Values within an ink component are zero (on the border with the background) or negative (within the component)—progressively increasing in magnitude as the center of the ink component is approached. In some cases when the distance of a particular warped point $x_p, y_p$ is wanted from a distance map, the coordinate $x_p, y_p$ is outside of the distance map boundaries. While some embodiments can ignore points that warped outside of the distance map, it may be useful to compute a distance for them instead. The distance value for point $x_p, y_p$ would be the value in the position at the nearest edge, plus the distance from the edge to $x_p, y_p$. Also, when generating a distance map from a medial axis when points will be looked up in the distance map, it is helpful to simply pad the border of a medial axis image before generating the distance map for it (and add an offset to the $x_p, y_p$ coordinates when looking them up in the padded distance map to compensate). If enough padding is used then all $x_p, y_p$ coordinates will fall within the distance map.

Medial Axis pixels are those in the distance map with values less than or equal to zero not having any 4-connected neighbors more negative than themselves. Embodiments may remove from the result any pixels for which the North, Northwest, and West neighbors are all also medial axis pixels.

For horizontal alignment of $M_1$, embodiments use a DTW algorithm, such as, for example, the algorithm described in work by Toni M. Rath and R. Manmatha titled "Word image matching using dynamic time warping" found in *Proc. of the Conference on Computer Vision and Pattern Recognition* (CVPR), volume 2, pages 521-527, Madison, Wis., June 2003, which is incorporated herein by reference in its entirety. Feature vectors $F_0$ and $F_1$ are computed from the normalized ink profile, upper word profile, lower word profile, and background to ink transition counts of the respective word images, $I_0$ and $I_1$. The DTW function to build the DP alignment table is:

$$D(i, j) = \min \begin{Bmatrix} D(i-1, j) \\ D(i, j) \\ D(i, j-1) \end{Bmatrix} + d(i, j),$$

where $d(i,j)$ is the cost to align $F_0(i)$ with $F_1(j)$, and is defined as:

$$d(i, j) = \sum_{k=1}^{4} (F_0(i, k) - F_1(j, k))^2$$

where k is the index to access the four features in the vector at the alignment position (profile, upper/lower indention profile, transition count). Embodiments may also use a Sakoe-Chiba band DP constraint with radius 15 as illustrated in the work by Toni M. Rath and R. Manmatha illustrated above.

The alignment of $F_0$ and $F_1$ is found by following the DP path backward through the DP table when the DTW algorithm is complete. The alignment is used to map x-coordinates from $M_0$ to the corresponding x-coordinate to be assigned to the corresponding control point in $M_1$. The same is done for y-coordinates using the DTW result for vertical alignment except that embodiments only use a single-dimensional feature vector—just the ink profile of the word images (projected onto the vertical axis). Therefore, in the equation above, the summation is only for k=1.

As quads in $M_0$ are rectangular, the s,t coordinate within a quad (s and t having range [0, 1]) is easy to calculate for any point x, y. The warped coordinate x', y' is then computed by bilinear interpolation of s,t within the vertices of the corresponding quad of the warp mesh, $M_1$.

In image morphing, the start and end mesh define a warp from one image to another. Interpolating positions and pixel colors at evenly-spaced time slices between the start and end results in a series of images forming a graphical morph from one image to the other. A work minimization approach to image morphing, such as that illustrated in work by Peisheng Gao and Thomas W Sederberg titled "A work minimization approach to image morphing" described in *The Visual Computer*, 14:390-400, 1998, which is incorporated herein by reference in its entirety, automatically generates the end mesh by iteratively improving the mesh—adjusting its control points to reduce the overall morph cost according to a work equation—and refining the mesh—subdividing it into more detailed quads. The work equation includes costs for work due to angle change, stretching, and pixel color change.

Embodiments adapt the morphing algorithm to the application of aligning handwritten words. Embodiments may implement an algorithm as follows:

```
refine_count = 0;
m = initial_mesh_height;
while m > 16
    m = m/2;
    refine_count = refine_count + 1
if static_refine_count ≠ −1 then
    refine_count = static_refine_count; // (some embodiments may
        use 0)
for mesh_level = 1 to refine_count + 1
    for imp = 1 to improve_count    // (embodiments may use 3)
        // improve:
        for each $P_{c,r}^1$
            x,y = $P_{c,r}^1$
            min = placement_cost$_{x,y}$
            XY$_{min}$ = x,y
            for each x,y in search area of $P_{c,r}^1$
                if placement_cost$_{x,y}$ < min then
                    min = placement_cost$_{x,y}$
                    XY$_{min}$ = x,y
            $P_{c,r}^1$ = XY$_{min}$     // (update control point)
    if mesh_level < refine_count
        // refine:
        increase resolution of $M_0$, $M_1$ by factor of 2
```

The refine step doubles mesh resolution by adding control points at the midpoints of each quad/edge in $M_0$, $M_1$.

The initial_mesh_height is the height used for each quad in $M_0$ (with the possible exception of the last row which may be smaller) before meshes are coarsely-aligned. Some embodiments use initial_mesh_height=max(4,$h_0$/meshdiv) where meshdiv is chosen empirically. Some embodiments use meshdiv=4. Some other embodiments use meshdiv=5.4.

In the improve step, each control point, $P_{c,r}^1$, is in turn moved to the lowest cost position within its current search area. The search area is constrained to a rectangular region surrounding the current position of the control point. The region extends 0.4δ in each direction, where δ is the current control point spacing in $M_0$ (δ gets halved every time a refine occurs). The search area is also constrained by the control points around it. For example, $P_{c,r}^1$ cannot go above any of the 3 control points above it in its 8-neighborhood.

The cost of placing $P_{c,r}^1$ at any given search position x,y within the search area is the placement cost. Some embodiments calculate the placement cost using:

$$\text{placement\_cost}_{x,y} = d\Delta_{x,y} + \frac{1}{n+1}\sum_{k=1}^{n} D_1(A_0'[k]),$$

where $A_0'$, are warped using the search position as the position of $P_{c,r}^1$ in $M_1$, n=$\|A_0'\|$, $D_1(A_0'[k])$ is the value in $D_1$ at the position of the $k^{th}$ warped medial axis point in $A_0'$, $\Delta_{x,y}$ is the Euclidean distance from x,y to the current position of $P_{c,r}^1$, and d is a constant used to weight the Δ term (some embodiments currently use d=0.01). In effect the cost of placing $P_{c,r}^1$ at this search position is the average distance the medial axis points of $I_0$ would be from the nearest medial axis pixels of $I_1$ if embodiments were to place $P_{c,r}^1$ at this search position. The Δ term introduces a small preference for keeping $P_{c,r}^1$ at or near its current position when multiple search positions are otherwise of equally low cost.

Some embodiments actually do not use the entire set $A_0'$ of medial axis pixels during cost calculation for search positions. As only the pixels within the four mesh quads sharing control point $P_{c,r}^1$ as a vertex move when the control point is adjusted, only the costs associated with those points will affect the cost at any given search position for that control point. To speed up processing, embodiments ignore all $A_0'$ points outside of the four adjacent quads.

After $M_1$ has been aligned using DP and morphing, embodiments compute the warped medial axis, $A_0'$, of $I_0$ (an example is illustrated by the shaded pixels in FIGS. 7 and 8). Embodiments then compute the distance map, $D_0'$, of the warped medial axis $A_0'$ (an example is illustrated in FIG. 8). An indication indicating whether or not the words are similar is if the $A_0'$ pixels are (on average) closely aligned to pixels of $A_1$ and the pixels of $A_1$ (e.g., the heavy-bordered pixels in FIG. 8) are also (on average) closely aligned to pixels of $A_0'$, or whether their values in the distance map are high, suggesting that the words are not aligned well and therefore not similar. Embodiments compute $C_{0\to 1}$, the cost to match $I_0$, $I_1$, as:

$$C_{0\to 1} = \frac{1}{\|A_0\|}\sum_{i=1}^{\|A_0\|} D_1(A_0'[i]) + \frac{1}{\|A_1\|}\sum_{i=1}^{\|A_1\|} D_0'(A_1[i]) + (p)\frac{w_{long}-w_{short}}{w_{long}},$$

where $D_1(A_0'[i])$ is the value in $D_1$ of the location of the $i^{th}$ medial axis pixel in $A_0'$, $D_0'(A_1[i])$ is the value in $D_0'$ of the location of the $i^{th}$ medial axis pixel in $A_1$. The last term of the equation is an optional term that penalizes mismatched word lengths, where p is a weighting constant for the penalty term (some embodiments use p=0.5) and $w_{long}$ and $w_{short}$ are the widths of the longer and shorter word images, respectively. Thus, the penalty is small when two words are close to the same length, and large when one word is much longer than the other.

Experiments have been performed on two datasets of labeled word images. The first dataset includes words from a set of 20 pages of George Washington's manuscripts. The second includes words from pages of Jennie Leavitt Smith's diary, downloaded from the "Mormon Missionary Diaries" online collection of the Brigham Young University Harold B. Lee Library, available at http://www.lib.byu.edu/dlib/mmd/. The experiment procedure manually segmented and labeled each word to provide ground truth for the illustrated experiments.

For each dataset, experiment procedure selected the first 1,000 word images as training examples for which the recognition system was allowed to look at the labels. The experiment procedure used the next 1,000 words (which are not used as training examples) as test data. The experiment procedure compared each test word with the training words and assigned it the label from the training word that it most closely matched. This was done both using the illustrated 2-D word warping method and also using just a 1-D Dynamic Time Warping alignment cost. The experiment procedure also recorded the word warping results when using only coarsely-aligned meshes without morphing.

The experiment procedure assessed the recognition accuracy of each method by comparing the ground truth labels with the labels assigned by the recognizer. Recognition accuracy was calculated as the number of test words labeled correctly by the recognizer (the number given the same label as its ground truth), divided by the total number of test words. The string comparison between the label and ground truth was case-sensitive.

As many of the test words were Out of Vocabulary (OoV) words, meaning no training examples had the same label as their ground truth, the experiment procedure also reported the recognition accuracy with respect to the number of in-vocabulary words (total test words minus the number of OoV test words). Table 2 illustrates word recognition accuracy experimental results.

TABLE 2

Washington Dataset - 1,000 test words (748 in-vocabulary)

| Method | Total Accuracy (# correct/# possible) | In-Vocab Accuracy (# correct/# possible) |
|---|---|---|
| DTW (1-D DP) | 60.60% (606/1000) | 81.02% (606/748) |
| Word Warping (only coarse aligned) | 65.40% (654/1000) | 87.43% (654/748) |
| Word Warping (morphing aligned) | 66.50% (665/1000) | 88.90% (665/748) |

Smith Dataset 1,000 test words (791 in-vocabulary)

| Method | Total Accuracy | In-Vocab Accuracy |
|---|---|---|
| DTW (1-D DP) | 57.10% (571/1000) | 72.19% (571/791) |
| Word Warping (only coarse aligned) | 64.70% (647/1000) | 81.80% (647/791) |
| Word Warping (morphing aligned) | 70.70% (707/1000) | 89.38% (707/791) |

The word warping method is noticeably more accurate than DTW (the baseline 1-D DP method) on both datasets. Even without using morphing to improve the warp mesh, word warping with coarsely-aligned meshes results in an increase in recognition accuracy of 6.41% for in-vocabulary words with the Washington manuscripts dataset and 9.61% with the Smith diary dataset. Recognition is even better when embodiments include the morphing step. For the Washington dataset, in-vocabulary accuracy is 88.90%, an increase of 7.88% from the baseline (DTW). For the Smith dataset, embodiments saw a larger improvement of 17.19% to 89.38%.

Morphing only contributes 1.47% to the accuracy of the Washington dataset, however, it contributes 7.58% to the accuracy of the Smith dataset. The Washington penmanship is exceptionally consistent but there is more variation in the Smith dataset, requiring better alignment in order to recognize words. Thus, word warping with morphing is adept at handling local variation and can generalize to datasets with multiple authors. This ability to handle variation allows embodiments to use synthetically-created training data to improve the OoV recognition accuracy.

Many of the recognition errors that embodiments see are minor, such as differences in case, single letters, or word endings. For many errors, the correct match is ranked very near the top as illustrated by Table 3 below. In fact, in experimental results, the correct result is ranked in the top 3 matches more than 94% of the time for both datasets.

TABLE 3

| Method | Top-1 | Top-3 | Top-5 | Top-10 |
|---|---|---|---|---|
| Washington Dataset - 1,000 test words (748 in-vocabulary) | | | | |
| DTW (1-D DP) | 81.02% (606/748) | 89.17% (667/748) | 91.58% (685/748) | 93.98% (703/748) |
| Word Warping | 88.90% (665/748) | 94.52% (707/748) | 96.26% (720/748) | 96.93% (725/748) |
| Smith Dataset - 1,000 test words (791 in-vocabulary) | | | | |
| DTW (1-D DP) | 72.19% (571/791) | 82.43% (652/791) | 86.35% (683/791) | 91.02% (720/791) |
| Word Warping | 89.38% (707/791) | 94.31% (746/791) | 94.82% (750/791) | 96.84% (766/791) |

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
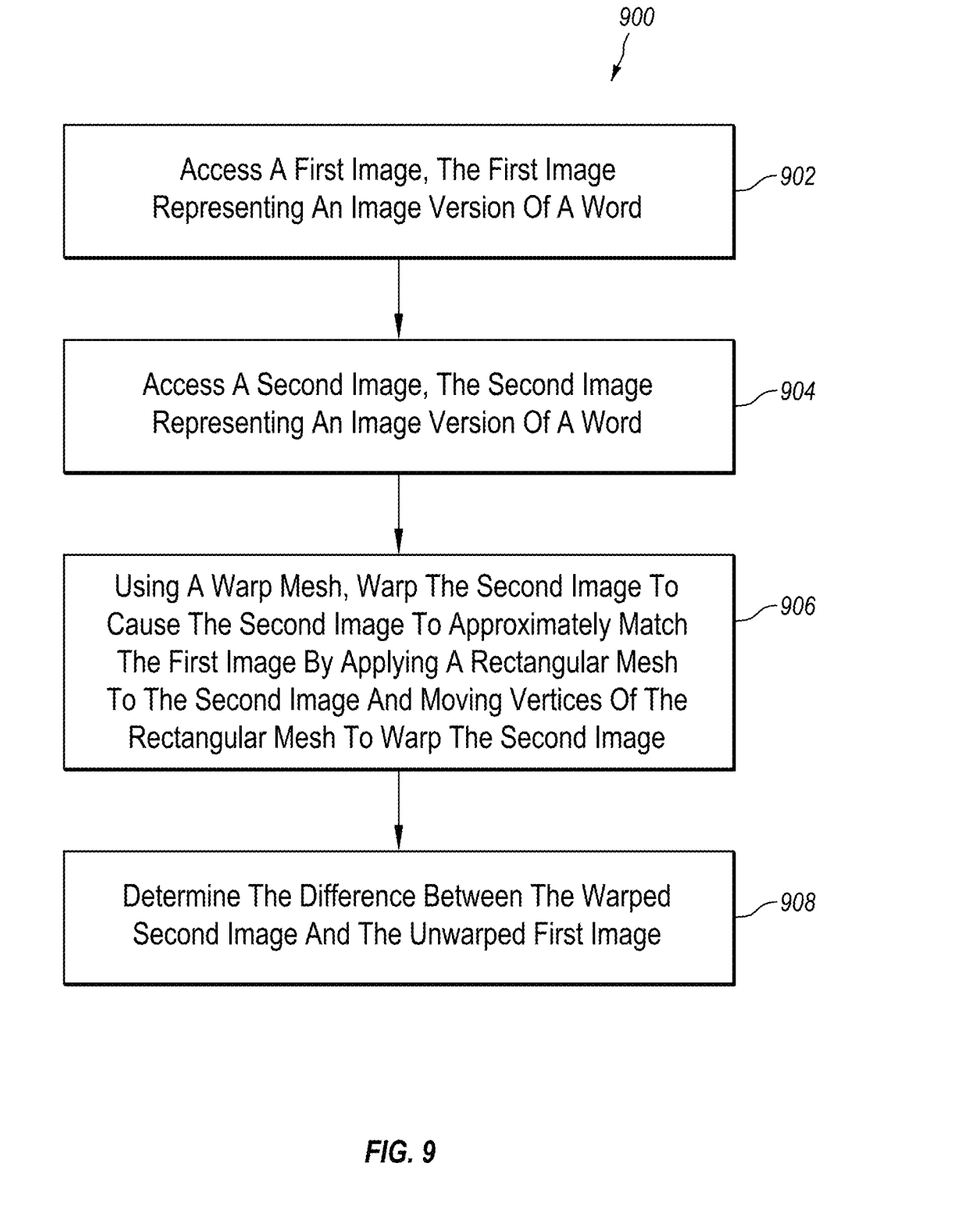
FIG. 9 illustrates a method of performing word recognition operations.

Referring now to FIG. 9, a method 900 is illustrated. The method 900 illustrates acts that may be performed in a computing environment. The method 900 includes acts for performing word recognition operations to determine what an image of a word represents. The method 900 includes accessing a first image, the first image representing an image version of a word (act 902). For example, FIG. 1 illustrates a first image 102 that may be accessed. The method 900 further includes accessing a second image, the second image representing an image version of a word (act 904). FIG. 1 illustrates a second image 104 that may be accessed.

The method 900 further includes using a warp mesh, warping the second image to cause the second image to approximately match the first image by applying a rectangular mesh to the second image and moving vertices of the rectangular mesh to warp the second image (act 906). For example. FIG. 2 illustrates application of a rectangular mesh 106 to the second image and a warp mesh 106' resulting from moving vertices of the rectangular mesh 106.

The method 900 further includes determining the difference between the warped second image and the unwarped first image (act 908). For example, FIG. 8 illustrates using a distance map 802 to determine the difference between the warped image 104' and the unwarped image 102.

The method 900 may further include, based on the difference between the warped second image and the unwarped first image, performing an operation to determine whether or not the first image and the second image likely represent the same word.

The method 900 may be practiced where the first and second images represent handwritten versions of words. In particular, embodiments may be useful for deciphering handwritten text to determine what the handwritten text represents.

The method 900 may be practiced where at least one of the first image or the second image represents a highly stylized version of a word. Even printed text can be difficult to decipher if it is highly stylized. Thus, embodiments may include functionality for performing recognition activities on stylized text. Stylized text may include, for example, machine-print, typeset, various fonts (including handwriting fonts), graphical symbols, characters, etc. Embodiments may be used for languages such as Chinese that use characters instead of an alphabet.

The method 900 may be practiced where the word represented by at least one of the first image or the second image is known based on a previous system training operation. For example, as illustrated above, a training session may receive manual or assisted machine input to identify words represented by various images. These training results can then be used for word recognition as described above.

As noted previously, the difference between a first warped image and a second unwarped image may not be the same as a second warped image and a first unwarped image. Thus, embodiments may compute both and add them together. Thus, the method 900 may further include using a warp mesh warping the first image to cause the first image to approximately match the second image by applying a rectangular mesh to the first image and moving vertices of the rectangular mesh to warp the first image, determining the difference between the warped first image and the unwarped second image, based on the difference between the warped second image and the unwarped first image and the difference between the warped first image and the unwarped second image, performing an operation to determine whether or not the first image and the second image likely represent the same word.

The method 900 may be practiced where determining the difference between the warped second image and the unwarped first image comprises computing a word matching cost. For example, FIG. 8 illustrates the use of a distance map to calculate a word matching cost. Thus, embodiments may further include creating a distance map mapping the distance between pixels of the second warped image and the first unwarped image. Computing a word matching cost may be based on the values in the distance map as illustrated previously herein. In some embodiments, the word matching cost is computed based on the average distance of all ink pixels representing a word in the second warped image to ink pixels representing a word in the first unwarped image.

Embodiments may be used to attempt to identify whether or not text was written by the same person. In particular, if the differences between an unwarped image and a warped image are sufficiently low, it may be determined that the text in the two images were written by the same person. Thus, the method 900 may further include, based on the difference between the warped second image and the unwarped first image, performing an operation to determine whether or not the first image and the second image likely represent handwritten text written by the same person.

Embodiments may warp both first and second word images to a third image to determine an approximate difference between the first two as the sum of the distances of each to the third. Alternately, embodiments may warp a first image to a third image, a second image to the third image, and the third image to the second image and likewise add the costs. Thus, the method 900 may further include accessing a third image, the third image representing an image version of a word; using a warp mesh, warping the third image to cause the third image to approximately match the first image by applying a rectangular mesh to the third image and moving vertices of the rectangular mesh to warp the third image; determining the difference between the warped third image and the unwarped first image; and based on the difference between the warped second image and the unwarped first image and the difference between the warped third image and the unwarped first image, determining the difference between the warped second image and the warped third image. Alternatively, the method 900 may further include accessing a third image, the third image representing an image version of a word; using a warp mesh, warping the third image to cause the third image to approximately match the second image by applying a rectangular mesh to the third image and moving vertices of the rectangular mesh to warp the third image; using a warp mesh, warping the first image to cause the first image to approximately match the third image by applying a rectangular mesh to the first image and moving vertices of the rectangular mesh to warp the first image; determining the difference between the warped third image and the unwarped second image; determining the difference between the warped first image and the unwarped third image; and combining the differences between the warped second image and the unwarped first image, the warped third image and the unwarped second image and the warped first image and the unwarped third image.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of performing word recognition operations to determine what an image of a word represents, the method comprising:
    accessing a first image, the first image representing an image version of a word;
    accessing a second image, the second image representing an image version of a word;
    applying a mesh to the second image using 2-D dynamic programming by:
        applying the mesh to the second image horizontally using 1-D dynamic programming such that vertices of the mesh in the horizontal direction are coarsely aligned and at least some of the vertices in the horizontal direction are not evenly spaced;
        independently applying the mesh to the second image vertically using 1_D dynamic programming such that vertices of the mesh in the vertical direction are coarsely aligned and at least some of the vertices in the vertical direction are not evenly spaced;
    warping the second image to cause the second image to approximately match the first image by moving vertices of the mesh to warp the second image; and
    determining the difference between the warped second image and the unwarped first image.

2. The method of claim 1 further comprising, based on the difference between the warped second image and the unwarped first image, performing an operation to determine whether or not the first image and the second image likely represent the same word.

3. The method of claim 1, wherein the first and second images represent handwritten versions of words.

4. The method of claim 1, wherein at least one of the first image or the second image represents a stylized version of a word.

5. The method of claim 1, wherein the word represented by at least one of the first image or the second image is known based on a previous system training operation.

6. The method of claim 1, further comprising:
    applying a mesh to the first image using 2-D dynamic programming by:
        applying the mesh to the first image horizontally using 1-D dynamic programming such that vertices of the mesh in the horizontal direction are coarsely aligned and at least some of the vertices in the horizontal direction are not evenly spaced;
        independently applying the mesh to the first image vertically using 1_D dynamic programming such that vertices of the mesh in the vertical direction are coarsely aligned and at least some of the vertices in the vertical direction are not evenly spaced;
    warping the first image to cause the first image to approximately match the second image by moving vertices of the mesh to warp the first image;
    determining the difference between the warped first image and the unwarped second image; and
    based on the difference between the warped second image and the unwarped first image and the difference between the warped first image and the unwarped second image, performing an operation to determine whether or not the first image and the second image likely represent the same word.

7. The method of claim 1, wherein determining the difference between the warped second image and the unwarped first image comprises computing a word matching cost.

8. The method of claim 7, further comprising creating a distance map mapping the distance between pixels of the second warped image and the first unwarped image, and wherein computing a word matching cost is based on the values in the distance map.

9. The method of claim 8, wherein the word matching cost is computed based on the average distance of all ink pixels representing a word in the second warped image to ink pixels representing a word in the first unwarped image.

10. The method of claim 1, further comprising based on the difference between the warped second image and the unwarped first image, performing an operation to determine whether or not the first image and the second image likely represent handwritten text written by the same person.

11. The method of claim 1, further comprising:
    accessing a third image, the third image representing an image version of a word;
    applying a mesh to the third image using 2-D dynamic programming by:
        applying the mesh to the third image horizontally using 1-D dynamic programming such that vertices of the mesh in the horizontal direction are coarsely aligned and at least some of the vertices in the horizontal direction are not evenly spaced;
        independently applying the mesh to the third image vertically using 1_D dynamic programming such that vertices of the mesh in the vertical direction are coarsely aligned and at least some of the vertices in the vertical direction are not evenly spaced;
    warping the third image to cause the third image to approximately match the first image by moving vertices of the mesh to warp the third image;
    determining the difference between the warped third image and the unwarped first image; and
    based on the difference between the warped second image and the unwarped first image and the difference between the warped third image and the unwarped first image, determining the difference between the warped second image and the warped third image.

12. The method of claim 1, further comprising:
accessing a third image, the third image representing an image version of a word;
applying a mesh to the third image using 2-D dynamic programming by:
applying the mesh to the third image horizontally using 1-D dynamic programming such that vertices of the mesh in the horizontal direction are coarsely aligned and at least some of the vertices in the horizontal direction are not evenly spaced;
independently applying the mesh to the third image vertically using 1_D dynamic programming such that vertices of the mesh in the vertical direction are coarsely aligned and at least some of the vertices in the vertical direction are not evenly spaced;
warping the third image to cause the third image to approximately match the second image by moving vertices of the mesh to warp the third image;
applying a mesh to the first image using 2-D dynamic programming by:
applying the mesh to the first image horizontally using 1-D dynamic programming such that vertices of the mesh in the horizontal direction are coarsely aligned and at least some of the vertices in the horizontal direction are not evenly spaced;
independently applying the mesh to the first image vertically using 1_D dynamic programming such that vertices of the mesh in the vertical direction are coarsely aligned and at least some of the vertices in the vertical direction are not evenly spaced
warping the first image to cause the first image to approximately match the third image by moving vertices of the mesh to warp the first image;
determining the difference between the warped third image and the unwarped second image;
determining the difference between the warped first image and the unwarped third image; and
combining the differences between the warped second image and the unwarped first image, the warped third image and the unwarped second image and the warped first image and the unwarped third image.

13. In a computing environment, computer program product for performing word recognition operations to determine what an image of a word represents, the computer program product comprising one or more computer readable memories comprising computer executable instructions that when executed by at least one processor cause at least one processor to perform the following:
accessing a first image, the first image representing an image version of a word;
accessing a second image, the second image representing an image version of a word;
applying a mesh to the second image using 2-D dynamic programming by:
applying the mesh to the second image horizontally using 1-D dynamic programming such that vertices of the mesh in the horizontal direction are coarsely aligned and at least some of the vertices in the horizontal direction are not evenly spaced;
independently applying the mesh to the second image vertically using 1_D dynamic programming such that vertices of the mesh in the vertical direction are coarsely aligned and at least some of the vertices in the vertical direction are not evenly spaced;
warping the second image to cause the second image to approximately match the first image by moving vertices of the mesh to warp the second image; and
determining the difference between the warped second image and the unwarped first image.

14. The computer program product of claim 13, further comprising, based on the difference between the warped second image and the unwarped first image, performing an operation to determine whether or not the first image and the second image likely represent the same word.

15. The computer program product of claim 13, further comprising:
applying a mesh to the first image using 2-D dynamic programming by:
applying the mesh to the first image horizontally using 1-D dynamic programming such that vertices of the mesh in the horizontal direction are coarsely aligned and at least some of the vertices in the horizontal direction are not evenly spaced;
independently applying the mesh to the first image vertically using 1_D dynamic programming such that vertices of the mesh in the vertical direction are coarsely aligned and at least some of the vertices in the vertical direction are not evenly spaced;
warping the first image to cause the first image to approximately match the second image by moving vertices of the mesh to warp the first image;
determining the difference between the warped first image and the unwarped second image; and
based on the difference between the warped second image and the unwarped first image and the difference between the warped first image and the unwarped second image, performing an operation to determine whether or not the first image and the second image likely represent the same word.

16. The computer program product of claim 13, wherein determining the difference between the warped second image and the unwarped first image comprises computing a word matching cost.

17. The computer program product of claim 16, further comprising creating a distance map mapping the distance between pixels of the second warped image and the first unwarped image, and wherein computing a word matching cost is based on the values in the distance map.

18. The computer program product of claim 17, wherein the word matching cost is computed based on the average distance of all ink pixels representing a word in the second warped image to ink pixels representing a word in the first unwarped image.

19. The computer program product of claim 13, further comprising based on the difference between the warped second image and the unwarped first image, performing an operation to determine whether or not the first image and the second image likely represent handwritten text written by the same person.

20. The method of claim 1, wherein moving vertices of the mesh to warp the first image is performed using a costing function such that lower cost movements of vertices are performed before higher cost movements of vertices as determined by the costing function.

21. A system for performing word recognition operations to determine what an image of a word represents
one or more processors; and
one or more computer readable media, wherein the one or more computer readable media comprise computer executable instructions that when executed by at least one of the one or more processors cause at least one of the one or more processors to perform the following:

accessing a first image, the first image representing an image version of a word;

accessing a second image, the second image representing an image version of a word;

applying a mesh to the second image using 2-D dynamic programming by:
   applying the mesh to the second image horizontally using 1-D dynamic programming such that vertices of the mesh in the horizontal direction are coarsely aligned and at least some of the vertices in the horizontal direction are not evenly spaced;
   independently applying the mesh to the second image vertically using 1_D dynamic programming such that vertices of the mesh in the vertical direction are coarsely aligned and at least some of the vertices in the vertical direction are not evenly spaced;

warping the second image to cause the second image to approximately match the first image by moving vertices of the mesh to warp the second image; and determining the difference between the warped second image and the unwarped first image.

* * * * *